(12) United States Patent
Nedachi et al.

(10) Patent No.: US 10,106,008 B2
(45) Date of Patent: Oct. 23, 2018

(54) SUSPENSION CONTROLLING APPARATUS FOR VEHICLE

(71) Applicant: HONDA MOTOR CO., LTD., Tokyo (JP)

(72) Inventors: Yoshiaki Nedachi, Wako (JP); Jun Ishikawa, Wako (JP); Hiroki Yoshino, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 210 days.

(21) Appl. No.: 15/071,427

(22) Filed: Mar. 16, 2016

(65) Prior Publication Data
US 2016/0272033 A1    Sep. 22, 2016

(30) Foreign Application Priority Data
Mar. 19, 2015   (JP) ................................. 2015-055851

(51) Int. Cl.
  *B60G 17/016*   (2006.01)
  *B60G 17/08*   (2006.01)
(52) U.S. Cl.
  CPC ......... *B60G 17/0164* (2013.01); *B60G 17/08* (2013.01); *B60G 2400/0511* (2013.01); *B60G 2400/102* (2013.01); *B60G 2400/204* (2013.01); *B60G 2400/252* (2013.01); *B60G 2400/30* (2013.01); *B60G 2400/302* (2013.01); *B60G 2400/33* (2013.01); *B60G 2400/39* (2013.01); *B60G 2400/50* (2013.01); *B60G 2500/10* (2013.01); *B60G 2600/187* (2013.01)
(58) Field of Classification Search
  CPC combination set(s) only.
  See application file for complete search history.

(56) References Cited

U.S. PATENT DOCUMENTS

| 5,442,554 A * | 8/1995 | Ohtagaki ............ B60G 17/018 280/5.504 |
| 2013/0184934 A1* | 7/2013 | Takeuchi ............ B60W 30/025 701/37 |
| 2015/0290995 A1* | 10/2015 | Kanda ................ B60G 17/0161 701/37 |

FOREIGN PATENT DOCUMENTS

| JP | 8-85373 A | 4/1996 |
| JP | 9-287651 A | 11/1997 |

(Continued)

OTHER PUBLICATIONS

Machine Traslation JP2014141123—Aug. 7, 2014—A suspension control device, Toyota, English Translation.*

*Primary Examiner* — Anne M Antonucci
*Assistant Examiner* — Renee LaRose
(74) *Attorney, Agent, or Firm* — Birch, Stewart, Kolasch & Birch, LLP

(57) ABSTRACT

A suspension controlling apparatus for a vehicle includes a suspension whose damping force is variably settable and a control unit capable of controlling the damping force of the suspension on the basis of a target damping force, to control the damping force of the suspension with a desired control amount and a high responsibility. A control unit includes a acceleration calculation device for calculating an acceleration in a forward and rearward direction of a vehicle on the basis of an operation input amount to the vehicle and a target damping force setting device for determining a target value of damping force on the basis of a damping force map determined in advance in response to the acceleration and a differentiation value of the acceleration.

20 Claims, 9 Drawing Sheets

(56) References Cited

FOREIGN PATENT DOCUMENTS

| JP | 11-301234 A | 11/1999 |
|---|---|---|
| JP | 2007-210590 A | 8/2007 |
| JP | 2009-208688 A | 9/2009 |
| JP | 2010-184512 A | 8/2010 |
| JP | 2010-195232 A | 9/2010 |
| JP | 2012-51395 A | 3/2012 |
| JP | 2014141123 A * | 8/2014 |
| WO | WO 2014/002444 A1 | 1/2014 |

* cited by examiner

SUSPENSION CONTROLLING APPARATUS FOR VEHICLE

CROSS-REFERENCE TO RELATED APPLICATIONS

The present application claims priority under 35 USC 119 to Japanese Patent Application No. 2015-055851 filed Mar. 19, 2015 the entire contents of which are hereby incorporated by reference.

BACKGROUND OF THE INVENTION

1. Field of the Invention

The present invention relates to a suspension controlling apparatus for a vehicle which includes a suspension whose damping force is variably settable. A control unit controls the damping force of the suspension on the basis of target damping force.

2. Description of Background Art

A suspension controlling apparatus is known that is configured such that acceleration of a vehicle in a forward and rearward direction is detected by an acceleration sensor and the damping force of a suspension is controlled on the basis of a detection value of the acceleration sensor. See, for example, Japanese Patent Laid-Open No. 2010-184512.

In addition, when it is tried to enhance the behavior of the vehicle body in the technology disclosed in Japanese Patent Laid-Open No. 2010-184512, then the suspension controlling apparatus reacts highly sensitively to a detection value of the acceleration sensor and it is difficult to control the damping force of the suspension with a desired controlling amount. Thus, it is recommendable to carry out a filter process for a detection value of the acceleration sensor so that the suspension controlling apparatus may not react highly sensitively. However, this gives rise to a delay with respect to the behavior of the vehicle body. Therefore, an improvement is demanded.

SUMMARY AND OBJECTS OF THE INVENTION

The present invention has been made in view of such a situation as described above. It is an object of an embodiment of the present invention to provide a suspension controlling apparatus for a vehicle for controlling damping force of a suspension with a desired controlling amount and a high responsibility.

According to an embodiment of the present invention, a suspension controlling apparatus for a vehicle includes a suspension whose damping force is variably settable and a control unit capable of controlling the damping force of the suspension on the basis of a target damping force. The control unit includes acceleration calculation means for calculating an acceleration in a forward and rearward direction of the vehicle on the basis of an operation input amount to the vehicle and target damping force setting means for determining the target damping force on the basis of a damping force map determined in advance in response to the acceleration and a differentiation value of the acceleration.

According to an embodiment of the present invention, the control unit receives, as an input thereto, a vehicle speed detected by a vehicle speed sensor and includes traveling resistance calculation means for calculating traveling resistance of the vehicle on the basis of the vehicle speed, and the acceleration calculation means calculates an acceleration in the forward and rearward direction of the vehicle on the basis of the traveling resistance obtained by the traveling resistance calculation means and the operation input amount.

According to an embodiment of the present invention, the suspension controlling apparatus for a vehicle may further include an engine speed sensor configured to detect an engine speed, gear ratio decision means for deciding a gear ratio of a transmission, and a throttle sensor configured to detect a throttle operation amount for controlling an intake air amount of the engine as the operation input amount. The acceleration calculation means calculates a driving force on the basis of the engine speed, gear ratio and throttle operation amount and calculates the acceleration on the basis of the driving force.

According to an embodiment of the present invention, the suspension controlling apparatus for a vehicle may further include brake operation amount detection means for detecting a brake operation amount as the operation input amount. The acceleration calculation means calculates the acceleration on the basis of deceleration corresponding to the brake operation amount.

According to an embodiment of the present invention, a variation amount limit value for limiting a variation amount of the target damping force is set in advance in the control unit.

According to an embodiment of the present invention, a variation amount limit value for acceleration and a variation amount limit value for deceleration which limit a variation amount of the target damping force are set in advance in the control unit.

According to an embodiment of the present invention, acceleration is calculated on the basis of an operation input amount to the vehicle and target damping force is determined in accordance with a map on the basis of the acceleration and a differentiation value of the acceleration. Therefore, the damping force of the suspension can be controlled with a desired controlling amount and a high responsibility.

According to an embodiment of the present invention, the acceleration in the forward and rearward direction of the vehicle is calculated taking not only the operation input amount but also traveling resistance of the vehicle calculated on the basis of the vehicle speed into consideration. Therefore, acceleration of a higher degree of accuracy can be obtained and suspension control of a higher degree of accuracy can be performed.

According to an embodiment of the present invention, acceleration can be calculated eliminating the necessity for a sensor for directly detecting acceleration in the forward and rearward direction of the vehicle. Thus, the suspension can be controlled with a high responsibility.

According to an embodiment of the present invention, deceleration can be calculated eliminating the necessity for a sensor for directly detecting acceleration in the forward and rearward direction of the vehicle. Thus, the suspension can be controlled with a high responsibility.

According to an embodiment of the present invention, an excessively great variation of the damping force of the suspension can be suppressed.

According to an embodiment of the present invention, an excessively great variation of the damping force can be suppressed while the suspension controlling apparatus suitably copes with acceleration and deceleration with the variation amount limit values to the target damping force suitably coping with acceleration and deceleration.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
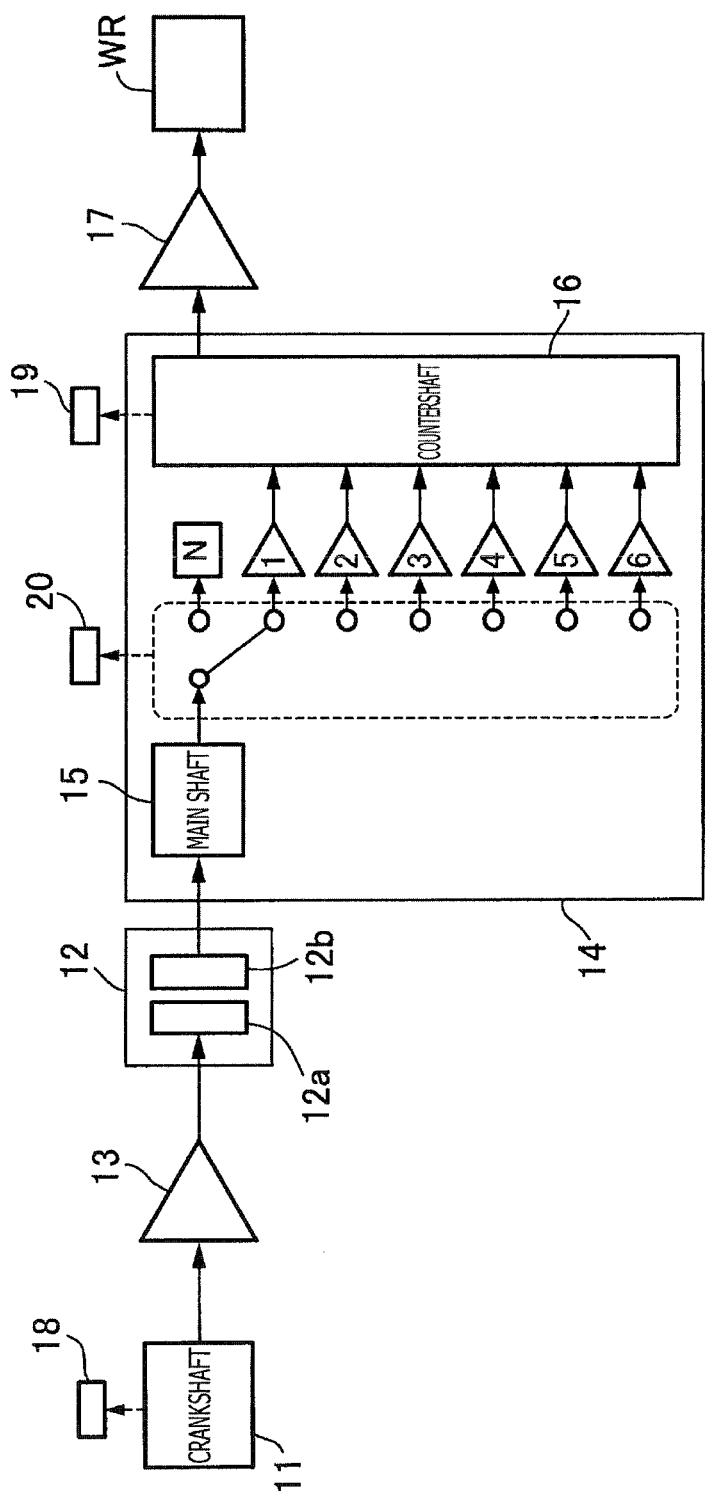
FIG. 1 is a block diagram depicting a configuration of a driving system of a motorcycle.

In the following, an embodiment of the present invention is described with reference to FIGS. 1 to 9. Referring first to FIG. 1, rotational power of a crankshaft 11 provided on an engine mounted on a vehicle such as a motorcycle is transmitted to an input member 12a of a clutch 12 through a primary reduction gear mechanism 13. The power from an output member 12b of the clutch 12 is inputted to a transmission 14. The transmission 14 is configured from selectively engageable first to sixth speed gear trains provided, for example, between a main shaft 15 and a countershaft 16. In a neutral state of the transmission 14, the rotational power transmitted from the output member 12b of the clutch 12 to the main shaft 15 is not transmitted to the countershaft 16. However, when the transmission 14 is not in the neutral state, the rotational power is transmitted to the countershaft 16 at a gear ratio given by selective engagement of the first to sixth speed gear trains. The rotational power of the countershaft 16 is transmitted to a rear wheel WR serving as a driving wheel through a final reduction gear mechanism 17.

As a rotational speed of the engine side with respect to the clutch 12, the rotational speed of the engine, namely, the rotational speed of the crankshaft 11 is detected by an engine speed sensor 18. Meanwhile, as a rotational speed of the transmission 14 side with respect to the clutch 12, the rotational speed of the countershaft 16 is detected by a countershaft rotational speed sensor 19. The gear ratio of the transmission 14 is decided by gear ratio decision means 20 for detecting the rotational angle of a shift drum provided in the transmission 14.

Figure 2:
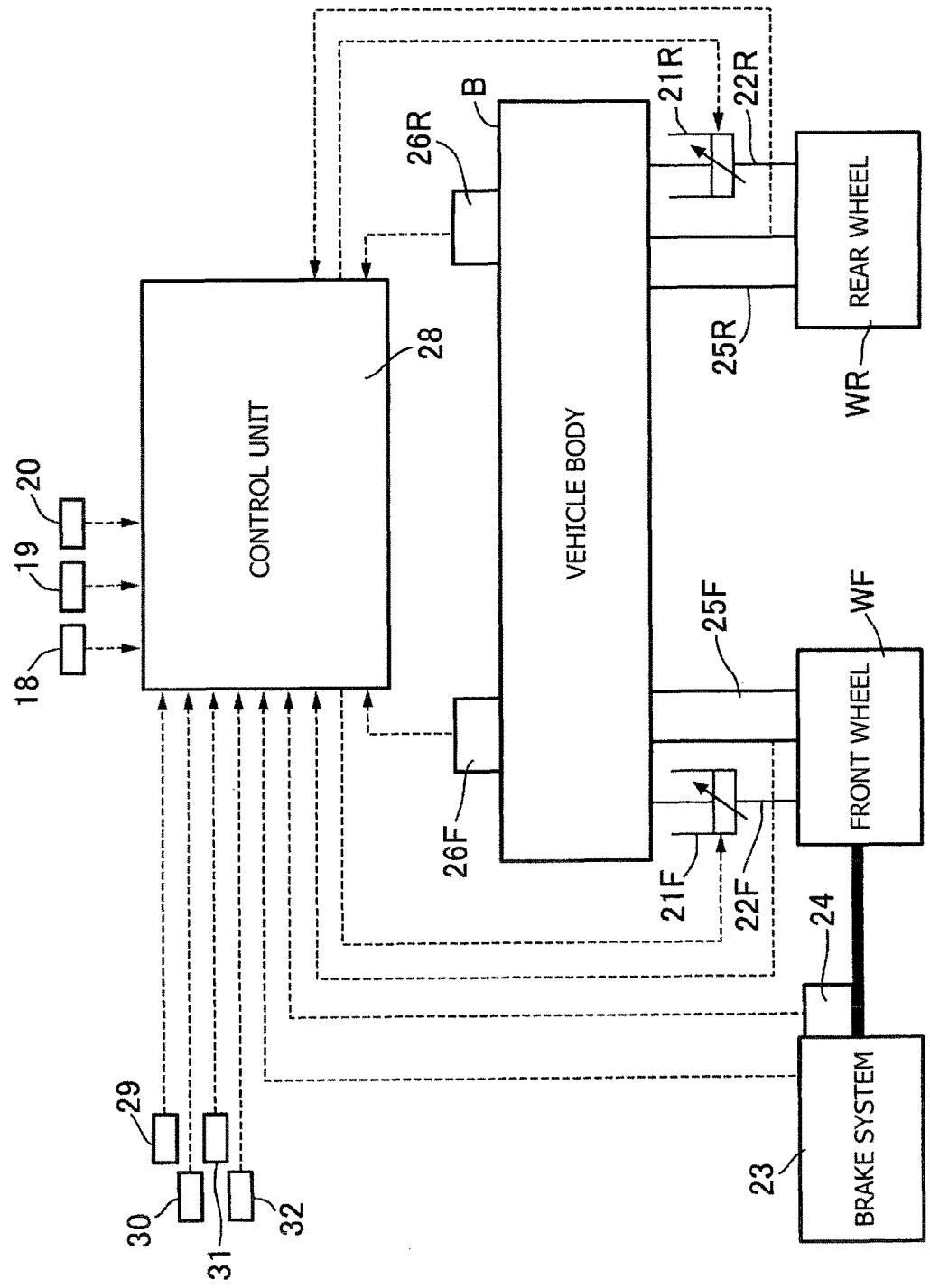
FIG. 2 is a block diagram depicting a configuration of a suspension controlling apparatus.

Referring to FIG. 2, a front wheel WF is suspended at a front portion of a vehicle body B of the motorcycle through a suspension 22F for a front wheel having a solenoid 21F by which damping force can be variably set. The rear wheel WR is suspended at a rear portion of the vehicle body B through a suspension 22R for a rear wheel having a solenoid 21R by which the damping force can be variably set.

A hydraulic brake is provided for the front wheel WF. Braking operation of the hydraulic brake is controlled by a brake system 23 which can carry out also antilock braking control. Output hydraulic pressure of a master cylinder (not depicted), provided in the brake system 23, is detected by a hydraulic pressure sensor 24 and represents a brake operation amount. A stroke sensor 25F for detecting a stroke of the suspension 22F for the front wheel is provided between the vehicle body B and the front wheel WF. A stroke sensor 25R for detecting a stroke of the suspension 22R for the rear wheel is provided between the vehicle body B and the rear wheel WR. Further, a vertical acceleration sensor 26F for detecting a vertical acceleration of a front portion of the vehicle body B by the suspension 22F for the front wheel and a vertical acceleration sensor 26R for detecting a vertical acceleration of a rear portion of the vehicle body B by the suspension 22R for the rear wheel are provided on the vehicle body B.

The damping force of the suspensions 22F and 22R varies by control of the operation of the solenoids 21F and 21R by a control unit 28. The control unit 28 receives signals inputted thereto from the engine speed sensor 18, countershaft rotational speed sensor 19, gear ratio decision means 20, hydraulic pressure sensor 24, stroke sensors 25F and 25R and vertical acceleration sensors 26F and 26R. Also signals from a roll angle sensor 29 for detecting a roll angle of the motorcycle, a vehicle speed sensor 30 for detecting the vehicle speed, a throttle sensor 31 and an actual acceleration sensor 32 for detecting an actual acceleration in the forward and rearward direction of the vehicle are inputted to the control unit 28. The throttle sensor 31 may be any sensor if it detects the opening of a throttle valve of the engine, an operation amount of a throttle grip and an intake air negative pressure of the engine. Further, a signal indicative of whether or not antilock braking control is being executed is inputted from the brake system 23 to the control unit 28.

Figure 3:
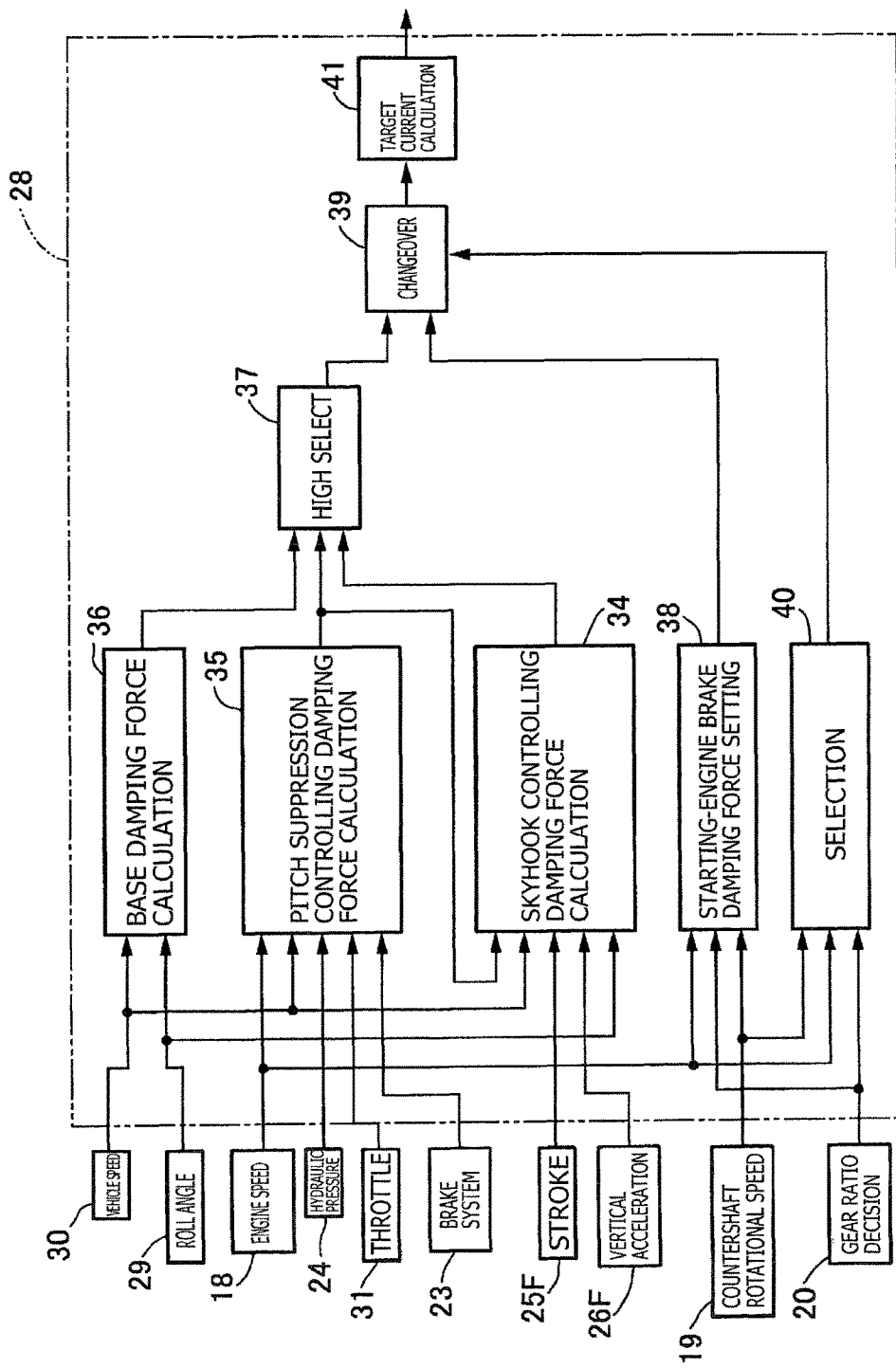
FIG. 3 is a block diagram depicting a portion of a control unit which controls a suspension for a front wheel.

Referring to FIG. 3, the control unit 28 includes a skyhook controlling damping force calculation unit 34, a pitch suppression controlling damping force calculation unit 35, a base damping force calculation unit 36, high select means 37, starting-engine brake damping force setting means 38, a target current calculation unit 41, changeover means 39, and a selection unit 40. The skyhook controlling damping force calculation unit 34 determines damping force for skyhook control of the suspensions 22F and 22R so as to stabilize the vehicle body against a road surface input. The pitch suppression controlling damping force calculation unit 35 determines damping force for pitch suppression control by which the suspensions 22F and 22R are controlled so that an appropriate pitch behavior in response to an operation input of a vehicle rider may be obtained. The base damping force calculation unit 36 determines damping force as a reference upon normal traveling in which none of the skyhook control and the pitch suppression control is executed. The high select means 37 selects a maximum one of values of the damping force determined by the skyhook controlling damping force calculation unit 34, pitch suppression controlling damping force calculation unit 35 and base damping force calculation unit 36. The starting-engine brake damping force setting means 38 determines damping force for vehicle starting and for engine braking. The target current calculation unit 41 calculates target current in response to the damping force inputted on the basis of the characteristics of the suspensions 22F and 22R. The changeover means 39 carries out changeover between a state in which an output of the high select means 37 is inputted to the target current calculation unit 41 and another state in which an output of the starting-engine brake damping force setting means 38 is inputted to the target current calculation unit 41. The selection unit 40 selects one of the states to be assumed by the changeover means 39.

To the starting-engine brake damping force setting means 38, a detection value of the engine speed sensor 18 which detects the rotational speed of the engine as the rotational speed of the engine side with respect to the clutch 12, a detection value of the countershaft rotational speed sensor 19 which detects the rotational speed of the countershaft 16 and a gear ratio decided by the gear ratio decision means 20 are inputted. The starting-engine brake damping force setting means 38 calculates the rotational speed of the main shaft 15 which is the rotational speed of the transmission 14 side with respect to the clutch 12 from the gear ratio decided by the gear ratio decision means 20 and the rotational speed of the countershaft 16 detected by the countershaft rotational speed sensor 19. When the rotational speed of the engine side with respect to the clutch 12 is equal to or higher than the rotational speed of the transmission 14 side with respect to the clutch 12, the starting-engine brake damping force setting means 38 sets the damping force to a given value suitable for starting of the vehicle. However, when the rotational speed of the engine side with respect to the clutch 12 is lower than the rotational speed of the transmission 14 side with respect to the clutch 12, the starting-engine brake damping force setting means 38 sets the damping force to a given value suitable for engine braking.

Figure 4:
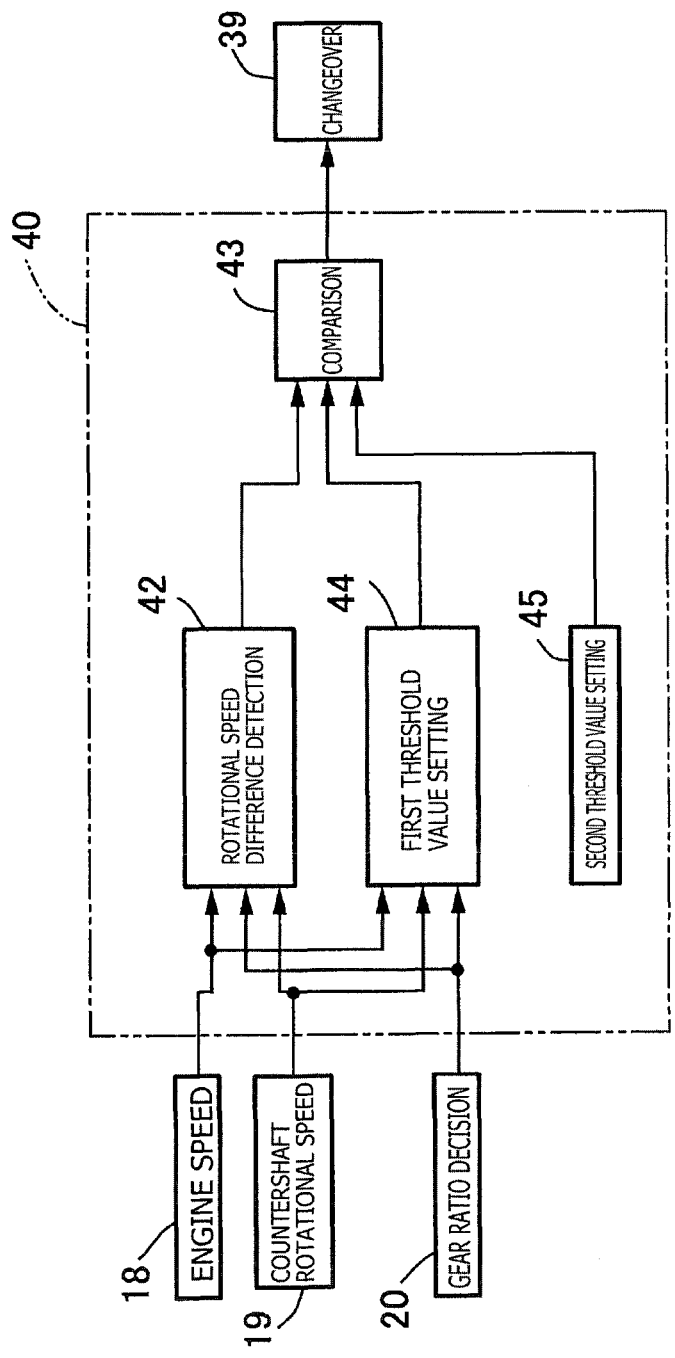
FIG. 4 is a block diagram depicting a configuration of a selection unit.

Referring to FIG. 4, the selection unit 40 includes rotational speed difference detection means 42, comparison means 43, first threshold value setting means 44 and second threshold value setting means 45. The rotational speed difference detection means 42 calculates the rotational speed difference across the clutch 12 provided between the engine and the transmission 14 on the basis of detection values of the engine speed sensor 18, countershaft rotational speed sensor 19 and gear ratio decision means 20. The comparison means 43 inputs, to the changeover means 39, a signal for determining to which state the changeover means 39 is to be set on the basis of the rotational speed difference obtained by the rotational speed difference detection means 42.

The rotational speed difference detection means 42 detects the rotational speed difference across the clutch 12 from the rotational speed of the engine, namely, of the crankshaft 11, detected by the engine speed sensor 18 and the rotational speed of the main shaft 15 calculated on the basis of the detection values of the countershaft rotational speed sensor 19 and the gear ratio decision means 20.

The comparison means 43 receives, as inputs thereto, a first threshold value determined by the first threshold value setting means 44 and a second threshold value determined by the second threshold value setting means 45. When the rotational speed difference exceeds the first threshold value, the comparison means 43 inputs, to the changeover means 39, a signal for inputting the given value determined by the starting-engine brake damping force setting means 38 to the target current calculation unit 41. However, the comparison means 43 inputs, to the changeover means 39, a signal for inputting the target damping force outputted from the high select means 37 to the target current calculation unit 41 in response to a drop of the rotational speed difference to a level equal to or lower than the second threshold value.

To the first threshold value setting means 44, a detection value of the engine speed sensor 18, a detection value of the countershaft rotational speed sensor 19 and a gear ratio decided by the gear ratio decision means 20 are inputted. When the detection value of the engine speed sensor 18 is equal to or higher than the rotational speed of the main shaft 15 obtained on the basis of the detection values of the countershaft rotational speed sensor 19 and the gear ratio decision means 20, the first threshold value setting means 44 sets the first threshold value to a threshold value which is suitable for starting of the vehicle and varies in response to the gear ratio. However, when the detection value of the engine speed sensor 18 is lower than the rotational speed of the main shaft 15, the first threshold value setting means 44 sets the first threshold value to a threshold value which is suitable for engine braking and varies in response to the gear ratio. The second threshold value setting means 45 determines the second threshold value as a value lower than the first threshold value.

According to such a configuration of the changeover means 39 and the selection unit 40 as described above, when the rotational speed difference across the clutch 12 detected by the rotational speed difference detection means 42 exceeds the first threshold value, the target damping force determined by one of the skyhook controlling damping force calculation unit 34, pitch suppression controlling damping force calculation unit 35 and base damping force calculation unit 36 is changed to the given value. Further, in response to a drop of the rotational speed difference to a level equal to or lower than the second threshold value which is lower than the first threshold value, the state in which the target value is changed to the given value is canceled. In addition, the first threshold value changes in response to the gear ratio of the transmission 14, and when the rotational speed of the engine side with respect to the clutch 12 is equal to or higher than the rotational speed of the transmission 14 side with respect to the clutch 12, the first threshold value is set to a threshold value suitable for starting of the vehicle. However, when the rotational speed of the engine side with respect to the clutch 12 is lower than the rotational speed of the transmission 14 side with respect to the clutch 12, the first threshold value is set to a threshold value suitable for engine braking. It is to be noted that the given value described above may vary in response to the rotational speed difference higher than the first threshold value.

To the base damping force calculation unit 36 which determines damping force to be used as a reference upon ordinary travelling in which none of skyhook control and pitch suppression control is executed, the detection values of the roll angle sensor 29 and the vehicle speed sensor 30 are inputted. The base damping force calculation unit 36 determines damping force to be used as a reference upon ordinary traveling on the basis of a map determined in advance which corresponds to the roll angle and the vehicle speed.

Figure 5:
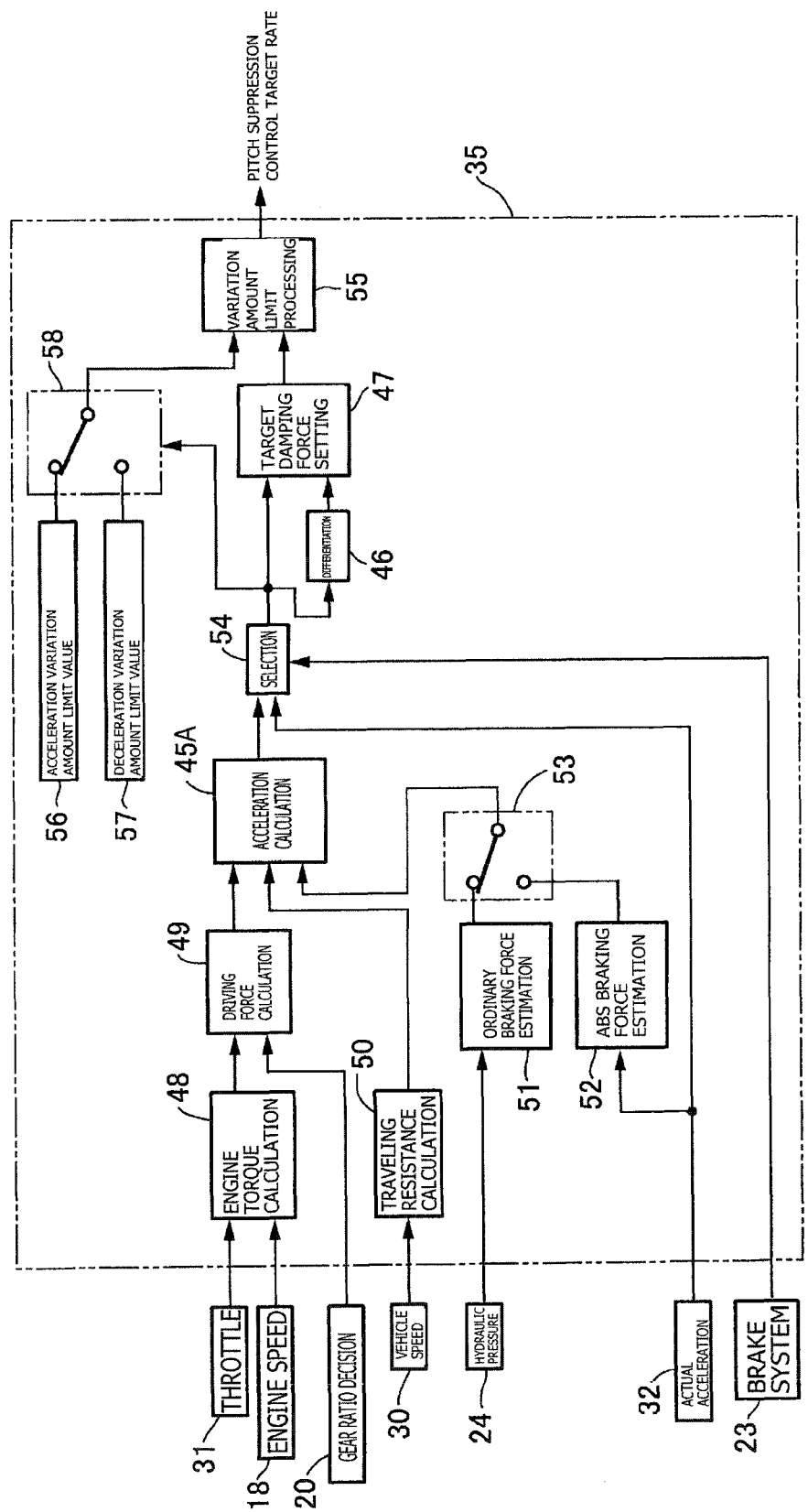
FIG. 5 is a block diagram depicting a configuration of a pitch controlling target damping force calculation unit.

Referring to FIG. 5, the pitch suppression controlling damping force calculation unit 35 includes acceleration calculation means 45A and target damping force setting means 47. The acceleration calculation means 45A calculates a forward and rearward direction acceleration of the vehicle on the basis of an operation input amount to the vehicle. The target damping force setting means 47 determines target damping force for pitch suppression control by a map search on the basis of the forward and rearward direction acceleration of the vehicle and a differentiation value of the acceleration.

The operation input amount to the vehicle is a throttle operation amount obtained by the throttle sensor 31 and a hydraulic pressure obtained by the hydraulic pressure sensor 24. Engine torque calculation means 48 calculates engine torque on the basis of the engine speed obtained by the engine speed sensor 18 and the throttle operation amount. Driving force calculation means 49 calculates driving force on the basis of the gear ratio obtained by the gear ratio decision means 20 and the engine torque. The driving force and a traveling resistance obtained by traveling resistance calculation means 50 are inputted to the acceleration calculation means 45A. The traveling resistance calculation means 50 calculates standard traveling resistance on the basis of the vehicle speed obtained by the vehicle speed sensor 30.

Ordinary braking force estimation means 51 estimates ordinary braking force on the basis of the hydraulic pressure obtained by the hydraulic pressure sensor 24, and upon ordinary braking in which antilock braking control is not executed, the ordinary braking force estimated by the ordinary braking force estimation means 51 is inputted to the acceleration calculation means 45A. On the other hand, braking force for antilock braking control when the signal from the brake system 23 indicates an antilock braking controlling state is estimated by the ABS braking force estimation means 52 on the basis of fixed decelerating force and a detection value of the actual acceleration sensor 32.

The braking forces estimated by the ordinary braking force estimation means 51 and the ABS braking force estimation means 52 are changed over by changeover means 53 in response to a braking state obtained from the brake system 23 and are inputted to the acceleration calculation means 45A. In particular, upon ordinary braking, the ordinary braking force estimated by the ordinary braking force estimation means 51 is inputted to the acceleration calculation means 45A whereas, upon antilock braking control, the given braking force for antilock braking control estimated by the ABS braking force estimation means 52 is inputted to the acceleration calculation means 45A.

The acceleration calculation means 45A receives driving force, standard traveling resistance and braking force inputted thereto and calculates acceleration in the forward and rearward direction on the basis of the acceleration force and the deceleration force applied to the motorcycle.

The acceleration in the forward and rearward direction obtained by the acceleration calculation means 45A is inputted to selection means 54. The selection means 54 selects the actual acceleration obtained by the actual acceleration sensor 32 when the acceleration in the forward and rearward direction obtained by the acceleration calculation means 45A when the braking state obtained from the brake system 23 is an antilock braking controlling state is equal to or lower than a given acceleration. However, in any other case, the selection means 54 selects the acceleration in the forward and rearward direction obtained by the acceleration calculation means 45A. The acceleration outputted from the selection means 54 is inputted to the target damping force setting means 47 and inputted also to first differentiation means 46. The acceleration is differentiated by the first differentiation means 46, and a differentiation value of the acceleration obtained by the differentiation is inputted to the target damping force setting means 47.

The target damping force determined by the target damping force setting means 47 is inputted to variation amount limit processing means 55. To the variation amount limit processing means 55, also a variation amount limit value for limiting the variation amount of the target damping force for the suspensions 22F and 22R is inputted. The variation amount limit processing means 55 carries out a limiting process for limiting the variation amount of the target damping force determined by the target damping force setting means 47 so that the variation amount does not to exceed the variation amount limit value. In particular, the given acceleration variation amount limit value obtained by acceleration variation amount limit value setting means 56 as the variation amount limit value upon acceleration and the given deceleration variation amount limit value obtained by deceleration variation amount limit value setting means 57 as a variation amount limit value upon deceleration are changed over by changeover means 58 on the basis of the signal outputted from the selection means 54 and inputted to the variation amount limit processing means 55. The target damping force for pitch suppression control obtained by the limiting process by the variation amount limit processing means 55 is outputted from the pitch suppression controlling damping force calculation unit 35.

Figure 6:
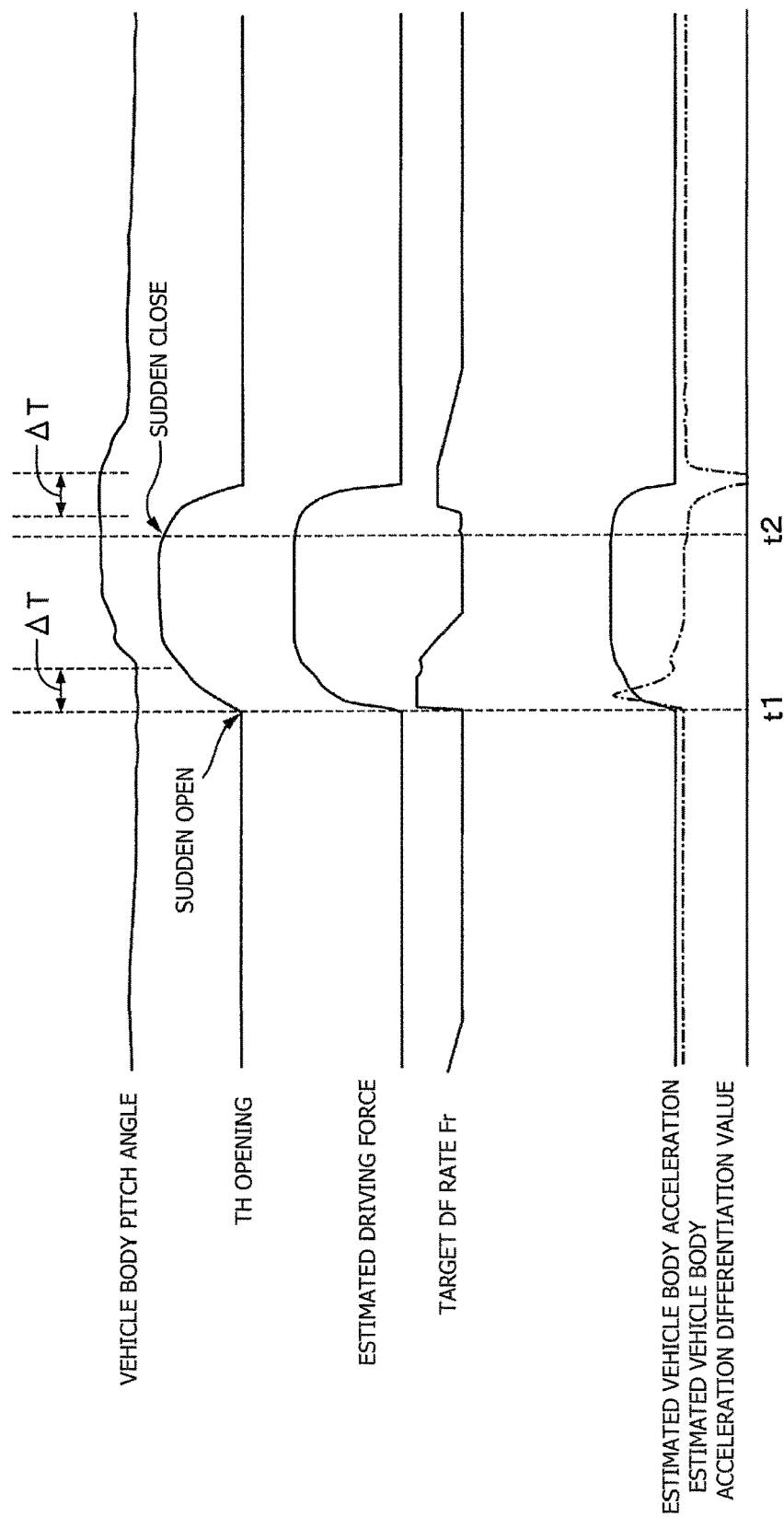
FIG. 6 is a timing chart illustrating a variation caused by a sudden throttle operation upon execution of pitch suppression control.

According to such pitch suppression control, for example, if a rider carries out a sudden throttle operation, then the target damping force for pitch suppression control is changed to set target damping force before a pitch behavior appears on the vehicle body as indicated by a timing chart of FIG. 6. In particular, driving force is estimated on the basis of the throttle opening and the acceleration in the forward and rearward direction is estimated on the basis of the driving force, and then target damping force is determined on the basis of the acceleration and a differentiation value of the acceleration. Therefore, if the throttle opening increases suddenly at time t1, then the target damping force immediately changes in response to a variation of the estimated driving force, acceleration in the forward and rearward direction and differentiation value of the acceleration. Thereupon, the target damping force changes so as to increase a time period ΔT (for example, 120 milliseconds) prior to appearance of a pitch behavior on the vehicle body. Further, if the throttle opening decreases suddenly at time t2, then the target damping force immediately changes in response to a variation of the estimated driving force, acceleration in the forward and rearward direction and differentiation value of the acceleration. Thereupon, the change of the target damping force appears more than the time period ΔT prior to the time at which the vehicle body pitch angle changes to the decreasing side.

Figure 7:
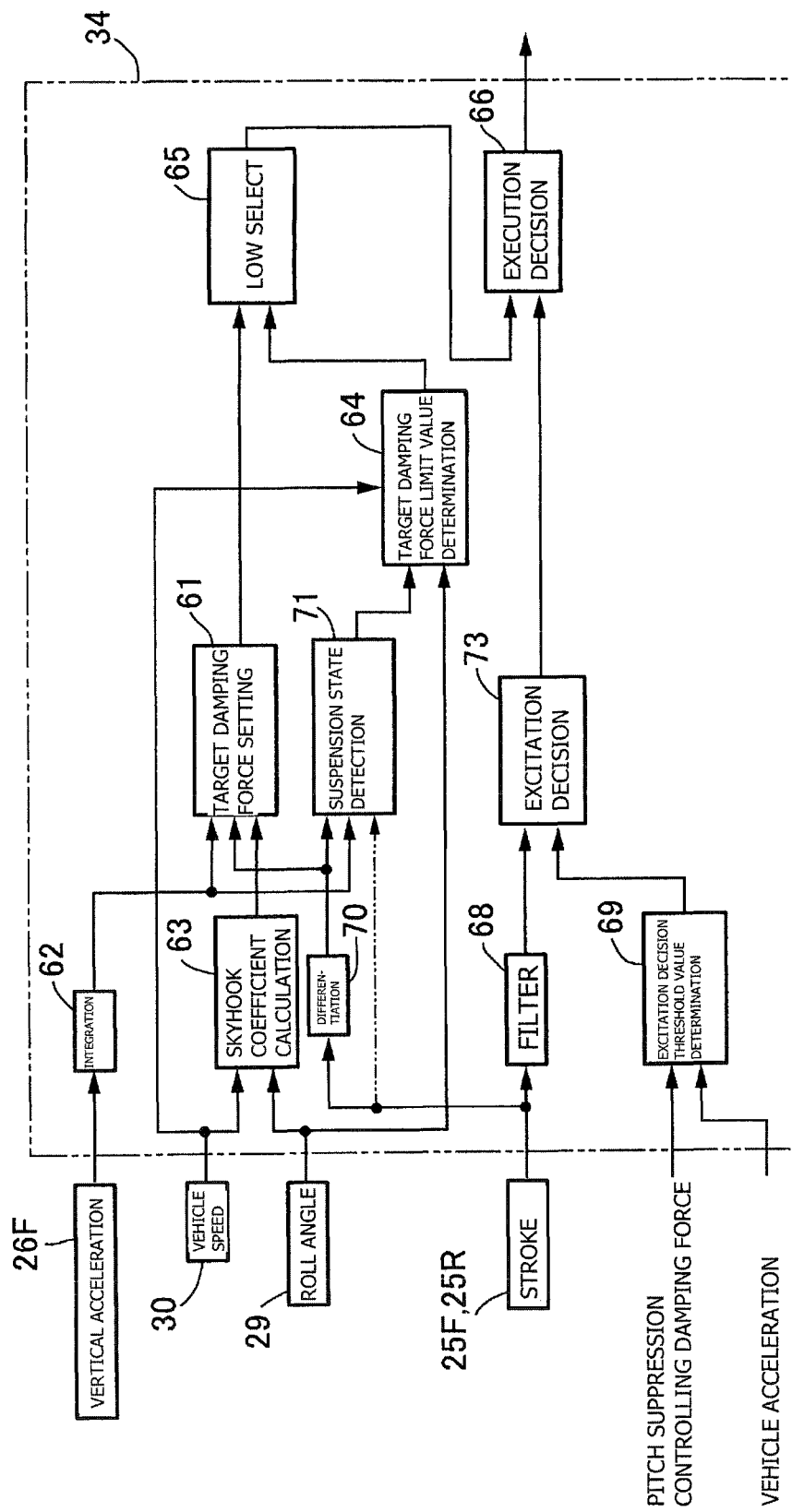
FIG. 7 is a block diagram depicting a configuration of a skyhook controlling target damping force calculation unit.

Referring to FIG. 7, the skyhook controlling damping force calculation unit 34 includes target damping force setting means 61 which determines target damping force for skyhook control on the basis of detection values of the vertical acceleration sensor 26F, roll angle sensor 29 and vehicle speed sensor 30.

The vertical acceleration obtained by the vertical acceleration sensor 26F is inputted to integration means 62 serving as vertical speed detection means. The integration means 62 integrates the vertical acceleration to obtain a vertical speed, which is inputted to the target damping force setting means 61. Stroke amounts of the suspensions 22F and 22R obtained by the stroke sensors 25F and 25R are inputted to second differentiation means 70, which differentiates the stroke amounts to obtain stroke speeds. The stroke speeds are inputted to the target damping force setting means 61. Further, detection values of the roll angle sensor 29 and the vehicle speed sensor 30 are inputted to skyhook coefficient calculation means 63, and a skyhook coefficient which depends upon the roll angle and the vehicle speed is inputted to the target damping force setting means 61.

The target damping force setting means 61 arithmetically operates and sets target damping force from a sprung vertical speed obtained by the integration means 62, an unsprung vertical speed determined from the stroke speed obtained by the second differentiation means 70 and the skyhook coefficient on the basis of the skyhook theory.

The skyhook controlling damping force calculation unit 34 includes suspension state detection means 71 for deciding whether the suspensions 22F and 22R are in a compressed state or in a decompressed state, and target damping force limit value determination means 64 for determining a limit value to the target damping force.

The suspension state detection means 71 decides, from the sprung vertical speed obtained by the integration means 62 and the unsprung vertical speed determined from the stroke speed obtained by the second differentiation means 70, which one of the compressed state and the decompressed state is taken by each of the suspensions 22F and 22R. However, the decision may be made otherwise from the stroke amounts of the suspensions 22F and 22R obtained by the stroke sensors 25F and 25R as indicated by a chain line in FIG. 7.

Figure 8:
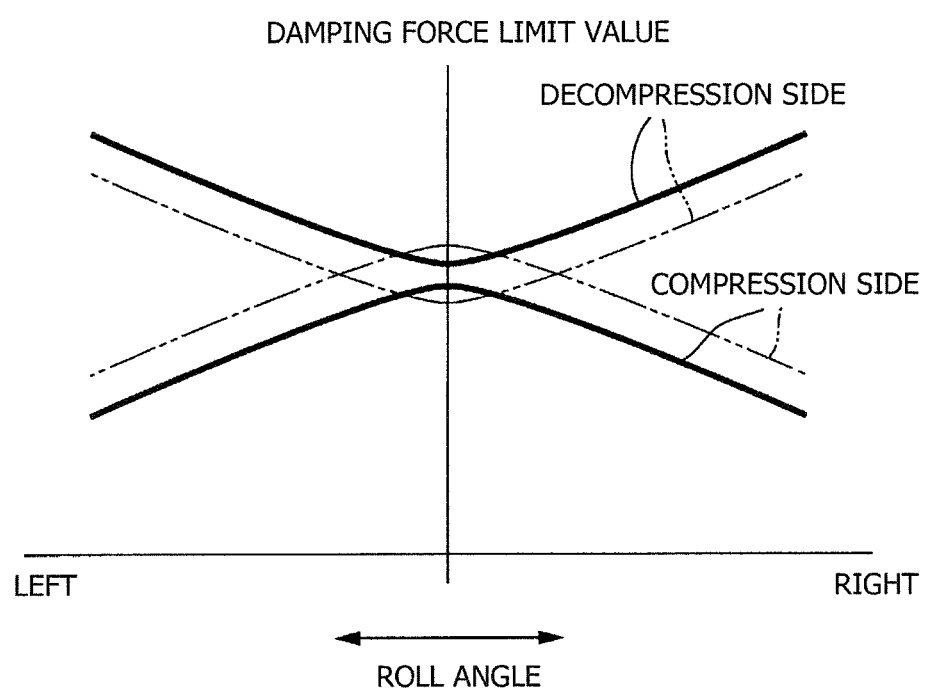
FIG. 8 is a view depicting a variation of skyhook controlling target damping force in response to a roll angle.

The target damping force limit value determination means 64 determines a limit value to the target damping force on the basis of a detection value of the suspension state detection means 71 and a roll angle obtained by the roll angle sensor 29. In particular, the target damping force limit value determination means 64 determines a target damping force limit value on the compression side when the suspensions 22F and 22R are in a compressed state and a target damping force limit value on the decompression side when the suspensions 22F and 22R are in a decompressed state such that a value obtained by subtracting the target damping force limit value on the compression side from the target damping force limit value on the decompression side may increase as the roll angle increases as depicted in FIG. 8. In particular, the target damping force limit value on the compression side is set so as to decrease as the roll angle increases, and the target damping force limit value on the decompression side is set so as to increase as the roll angle increases. Thereupon, the target damping force limit value on the decompression side may be higher than the target damping force limit value on the compression side irrespective of the roll angle as indicated by a solid line in FIG. 8, and in a region in which the roll angle is small, the target damping force limit value on the compression side may be higher than the target damping force limit value on the decompression side as indicated by a chain line in FIG. 8.

Further, as depicted in FIG. 7, a vehicle speed obtained by the vehicle speed sensor 30 is inputted to the target damping force limit value determination means 64. The target damping force limit value determination means 64 changes the magnitude or the gradient of the target damping force limit value on the compression side and the target damping force limit value on the decompression side in response to the vehicle speed.

Meanwhile, a skyhook coefficient determined by the skyhook coefficient calculation means 63 may be set such that the target damping force set by the target damping force setting means 61 decreases in a state in which the vehicle speed exceeds a given speed or may be set such that it is outputted as map data determined in advance depending upon the roll angle and the vehicle speed.

The skyhook controlling damping force calculation unit 34 has low select means 65 which selects a lower value from between the target damping force determined by the target damping force setting means 61 and the target damping force limit value determined by the target damping force limit value determination means 64. In particular, if the target damping force for skyhook control determined by the target damping force setting means 61 exceeds the target damping force limit value determined by the target damping force limit value determination means 64, then the target damping force limit value is outputted as skyhook target damping force from the low select means 65.

The target damping force for skyhook control outputted from the low select means 65 is outputted from execution decision means 66 only when excitation decision means 73 decides that a vibration state of the vehicle in the vertical direction is a given vibration state.

The excitation decision means 73 receives detection values of the stroke sensors 25F and 25R filtered by a filter 68 and an excitation decision threshold value determined by excitation decision threshold value determination means 69 as inputs thereto. The excitation decision means 73 decides that a state in which the detection values of the stroke sensors 25F and 25R exceed the excitation decision threshold value is a given vibration state.

The excitation decision threshold value determination means 69 receives, as inputs thereto, target damping force calculated by the pitch suppression controlling damping force calculation unit 35 and outputted from the changeover means 39 and acceleration in the forward and rearward direction outputted from the selection means 54 of the pitch suppression controlling damping force calculation unit 35. The excitation decision threshold value determination means 69 changes the excitation decision threshold value to a value on a side on which skyhook control is less likely to be started when the acceleration in the forward and rearward direction is outside a given range. Further, during execution of pitch suppression control, the excitation decision threshold value determination means 69 changes the excitation decision threshold value to a value on the side on which skyhook control is less likely to be started. More specifically, when the acceleration in the forward and rearward direction is outside the given range and while pitch suppression control is being executed, the excitation decision threshold value determination means 69 changes a decision condition for the given vibration state for deciding whether or not skyhook controlling damping force control is to be started to a condition on the side on which skyhook control is less likely to be started.

Figure 9:
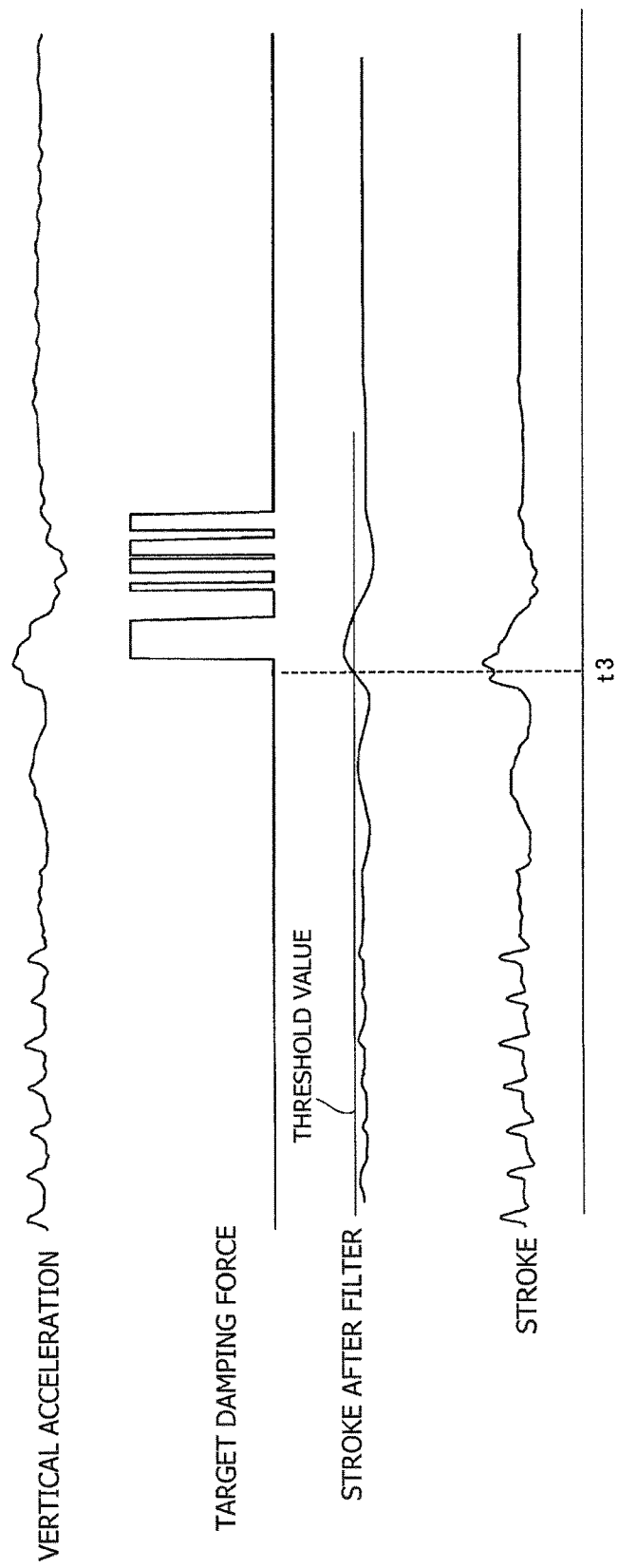
FIG. 9 is a timing chart upon execution of skyhook control.

According to such skyhook control, skyhook control is started at time t3 at which the stroke detected by the stroke sensor 25F and filtered by the filter 68 exceeds the excitation decision threshold value as depicted in FIG. 9. Thus, damping force control of the suspension 22F is executed on the basis of the determined skyhook controlling target damping force.

While the damping force of the suspensions 22F and 22R is controlled by the control unit 28 on the basis of target damping force, the control unit 28 has the rotational speed difference detection means 42 for detecting a rotational speed difference across the clutch 12 provided between the engine and the transmission 14 and changes the target damping force to a given value when the rotational speed difference exceeds the first threshold value. Therefore, it is perceived in advance that a sudden acceleration variation is caused by the rotational speed difference across the clutch 12 between the engine and the transmission 14, and the damping force of the suspensions 22F and 22R can be controlled appropriately in advance. Consequently, the posture of the vehicle body can be stabilized.

Further, the control unit 28 cancels the state in which the target damping force is changed to the given value in response to a decrease of the rotational speed difference to a value equal to or lower than the second threshold value which is lower than the first threshold value. Therefore, the ordinary target damping force control can be restored in response to a decrease of the rotational speed difference across the clutch 12.

Further, since the control unit 28 changes the first threshold value in response to a decision result of the gear ratio decision means 20 for deciding a gear ratio of the transmission 14, the damping force of the suspensions 22F and 22R can be controlled appropriately in response to the gear ratio of the transmission 14.

Further, the control unit 28 changes the first threshold value to a threshold value suitable for starting of the vehicle and changes the given value to a given value suitable for starting of the vehicle when the rotational speed on the engine side with respect to the clutch 12 is equal to or higher than the rotational speed on the transmission 14 side with respect to the clutch 12. Therefore, upon starting of the vehicle, the damping force of the suspensions 22F and 22R can be set to an appropriate level.

The control unit 28 changes the first threshold value to a threshold value suitable for engine braking and changes the given value to a given value suitable for engine braking when the rotational speed on the engine side with respect to the clutch 12 is lower than the rotational speed on the transmission 14 side with respect to the clutch 12. Therefore, upon engine braking, the damping force of the suspensions 22F and 22R can be set to an appropriate level.

The control unit 28 includes the pitch suppression controlling damping force calculation unit 35 which determines damping force for pitch suppression control in which the suspensions 22F and 22R are controlled so that an appropriate pitch behavior corresponding to an operation input of the vehicle rider is obtained. The pitch suppression controlling damping force calculation unit 35 has the acceleration calculation means 45A and the target damping force setting means 47. The acceleration calculation means 45A calculates acceleration in the forward and rearward direction of the vehicle on the basis of an operation input amount to the vehicle. The target damping force setting means 47 determines target damping force for pitch suppression control on the basis of a damping force map determined in advance in response to the acceleration and a differentiation value of the acceleration. The control unit 28 thus calculates acceleration on the basis of an operation input amount to the vehicle and determines target damping force of the suspensions 22F and 22R from the map on the basis of the acceleration and a differentiation value of the acceleration. Therefore, the suspensions 22F and 22R can react in a good response reading a will of the rider from the operation amount of the rider, and the damping force of the suspensions 22F and 22R can be controlled with a desirable control amount prior to a behavior of the vehicle body.

The pitch suppression controlling damping force calculation unit 35 includes the traveling resistance calculation means 50 which calculates traveling resistance of the vehicle on the basis of the vehicle speed detected by the vehicle speed sensor 30. Since the acceleration calculation means 45A calculates acceleration in the forward and rearward direction of the vehicle on the basis of the traveling resistance obtained by the traveling resistance calculation means 50 and the operation input amount, the acceleration calculation means 45A calculates acceleration in the forward and rearward direction of the vehicle taking not only the operation input amount but also the traveling resistance of the vehicle calculated on the basis of the vehicle speed into consideration. Consequently, acceleration of a higher degree of accuracy can be obtained and more accurate suspension control can be achieved.

The driving force calculation means 49 calculates driving force on the basis of the engine speed detected by the engine speed sensor 18 and the throttle operation amount detected by the throttle sensor 31, and the acceleration calculation means 45A calculates acceleration on the basis of the driving force and the gear ratio of the transmission 14 decided by the gear ratio decision means 20. Therefore, the acceleration is calculated eliminating the necessity for a sensor for directly detecting acceleration of the vehicle in the forward and rearward direction, and the suspensions can be controlled with a high response.

The acceleration calculation means 45A calculates acceleration on the basis of deceleration corresponding to the detection value of the hydraulic pressure sensor 24 which detects the brake operation amount as the operation input amount. Therefore, the deceleration is calculated eliminating the necessity for a sensor for directly detecting acceleration of the vehicle in the forward and rearward direction, and the suspensions 22F and 22R can be controlled with a high response.

In addition, since the acceleration calculation means 45A calculates acceleration on the basis of the braking force and the driving force of the engine, the acceleration upon braking can be calculated with a high degree of accuracy. Further, since the acceleration calculation means 45A calculates the driving force of the engine on the basis of the torque of the engine, the acceleration calculation means 45A can calculate the driving force during braking with a high degree of accuracy and thus can calculate the acceleration during braking with a higher degree of accuracy. Further, since the driving force of the engine is calculated on the basis of the torque of the engine and the gear ratio, the driving force during braking can be calculated with a high degree of accuracy, and the acceleration during braking can be calculated with a higher degree of accuracy.

Since the variation amount limit value is set in advance by the pitch suppression controlling damping force calculation unit 35 such that the variation amount of the target damping force is limited, an excessively great variation of the damping force of the suspensions 22F and 22R can be suppressed. For example, when a sudden damping force variation occurs upon a change from sudden acceleration to steady acceleration, the damping force can be made closer to the target damping force for every variation amount limit value. Therefore, the damping force can be varied smoothly. In addition, since a variation amount limit value during acceleration and a variation amount limit value during deceleration for limiting the variation amount of the target damping force are set in advance, the pitch suppression controlling damping force calculation unit 35 can suppress an excessively great variation of the damping force while it can be appropriately made suitable for acceleration and for deceleration.

Although the acceleration calculation means 45A calculates, upon ordinary braking, acceleration on the basis of ordinary braking force corresponding to the detection value of the hydraulic pressure sensor 24, upon antilock braking control, the acceleration calculation means 45A calculates acceleration on the basis of given antilock brake controlling braking force. Therefore, also upon antilock braking control, appropriate suspension control can be carried out.

The pitch suppression controlling damping force calculation unit 35 determines, when the acceleration calculated by the acceleration calculation means 45A during antilock braking control is equal to or lower than the given acceleration, the target deceleration force is determined on the basis of the actual acceleration obtained by the actual acceleration sensor 32 which detects the actual acceleration of the vehicle in the forward and rearward direction. Therefore, even if a difference appears between the actual acceleration and the acceleration calculated on the basis of the brake hydraulic pressure depending upon the state of the road surface on which the vehicle travels, the damping force can be controlled appropriately using the actual acceleration.

The control unit 28 includes the skyhook controlling damping force calculation unit 34 which determines the damping force for skyhook control of the suspensions 22F and 22R so as to stabilize the vehicle body against a road surface input. The skyhook controlling damping force calculation unit 34 includes the target damping force setting means 61 which arithmetically operates and sets target damping force from a sprung vertical speed obtained by the integration means 62, an unsprung vertical speed determined from a stroke speed obtained by the second differentiation means 70 and a skyhook coefficient on the basis of the skyhook theory. Therefore, the stability of the vehicle can be promoted further.

The skyhook controlling damping force calculation unit 34 includes the suspension state detection means 71 for deciding whether the suspensions 22F and 22R are in a compressed state or in a decompressed state, and the target damping force limit value determination means 64 for determining a limit value to the target damping force. More particularly, the target damping force limit value determination means 64 determines the limit value to the target damping force such that a value obtained by subtracting the target damping force limit value on the compression side when the suspensions 22F and 22R are in a compressed state from the target damping force limit value on the decompression side when the suspensions 22F and 22R are in a decompressed state increases as the roll angle of the vehicle obtained by the roll angle sensor 29 increases whereas the target damping force limit value on the compression side decreases as the roll angle increases. The low select means 65 selects a lower value from between the target damping force determined by the target damping force setting means 61 and the target damping force limit value determined by the target damping force limit value determination means 64. Therefore, the target damping force for the skyhook control when the suspensions 22F and 22R are in a compressed state during turning is weakened. Consequently, while a vibration suppression performance is assured, the rolling stability against an input from the road surface can be increased. In addition, a moderate pitching behavior is provided at rising from a corner. Consequently, a turning characteristic is improved and appropriate damping force can be obtained, and besides a response to steering can be assured.

The skyhook controlling damping force calculation unit 34 determines, when the target damping force for skyhook control determined by the target damping force setting means 61 exceeds the damping force limit value, the damping force limit value as the target damping force for skyhook control. Therefore, the control amount for the suspensions 22F and 22R can be suppressed to a value equal to or lower than the damping force limit value.

Since the damping force limit value changes in response to the vertical speed and the roll angle, the control amount for the suspensions 22F and 22R can be suppressed to a value equal to or lower than the damping force limit value in response to various vehicle states.

The excitation decision threshold value determination means 69 provided in the skyhook controlling damping force calculation unit 34 changes, when the acceleration in the forward and rearward direction is outside the given range and during execution of pitch suppression control, the excitation decision threshold value so that the decision condition for a given vibration state for deciding whether or not the skyhook controlling damping force control is to be started is set to a condition on the side on which skyhook control is less likely to be started. Further, when the excitation decision means 73 decides that the vibration state of the vehicle in the vertical direction is in the given vibration state on the basis of the excitation decision threshold value, the excitation decision threshold value determination means 69 outputs target damping force for executing the skyhook control. Therefore, it is possible to execute suspension control while a pitching behavior is left appropriately. In addition, not turning on-off of skyhook control is changed over directly, but ease of intervention is changed by changing the threshold value. Therefore, upon occurrence of a disturbance for which vibration suppression is required, vibration suppression can be started appropriately.

Further, during execution of the pitch suppression control, the decision condition of the given vibration state is changed to a condition on the side on which damping force control for skyhook control of the suspensions 22F and 22R is less likely to be started. Therefore, upon acceleration or deceleration or when pitching suppression control is being executed, excessive damping force control by the skyhook control is not carried out.

The excitation decision means 73 decides the given vibration state which is used as a reference for starting the skyhook control from the strokes of the suspensions 22F and 22R detected by the stroke sensors 25F and 25R. Therefore, the vibration state of the vehicle can be detected appropriately from the stroke amounts of the suspensions 22F and 22R.

While the embodiment of the present invention has been described, the present invention is not limited to the embodiment described above, but allows various design changes without departing from the spirit of the present invention described in the claims.

For example, the present invention can be applied not only to a motorcycle but also widely to vehicles including four-wheeled vehicles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A suspension controlling apparatus for a vehicle, comprising:
   a suspension having a variably settable damping force; and
   a control unit capable of controlling the damping force of the suspension on the basis of a target damping force, the control unit configured to:
   calculate an acceleration in a forward and rearward direction of the vehicle on the basis of an operation input amount to the vehicle; and determine the target damping force on the basis of a damping force map determined in advance in response to the acceleration and a differentiation value of the acceleration.

2. The suspension controlling apparatus for a vehicle according to claim 1, wherein the control unit receives, as an input thereto, a vehicle speed detected by a vehicle speed sensor and is further configured to calculate traveling resistance of the vehicle on the basis of the vehicle speed, and calculate the acceleration in the forward and rearward direction of the vehicle on the basis of the traveling resistance and the operation input amount.

3. The suspension controlling apparatus for a vehicle according to claim 2, wherein the control unit is further configured to:
   detect a brake operation amount as the operation input amount; and
   calculate the acceleration on the basis of deceleration corresponding to the brake operation amount.

4. The suspension controlling apparatus for a vehicle according to claim 2, wherein a variation amount limit value for limiting a variation amount of the target damping force is set in advance in the control unit.

5. The suspension controlling apparatus for a vehicle according to claim 1, and further comprising:
   an engine speed sensor configured to detect an engine speed;
   a gear ratio selector for deciding a gear ratio of a transmission; and
   a throttle sensor configured to detect a throttle operation amount for controlling an intake air amount of the engine as the operation input amount;
   wherein the control unit is further configured to calculate a driving force on the basis of the engine speed, gear ratio and throttle operation amount and calculates the acceleration on the basis of the driving force.

6. The suspension controlling apparatus for a vehicle according to claim 5, wherein the control unit is further configured to:
   detect a brake operation amount as the operation input amount; and
   calculate the acceleration on the basis of deceleration corresponding to the brake operation amount.

7. The suspension controlling apparatus for a vehicle according to claim 5, wherein a variation amount limit value for limiting a variation amount of the target damping force is set in advance in the control unit.

8. The suspension controlling apparatus for a vehicle according to claim 1, and further comprising:
   an engine speed sensor configured to detect an engine speed;
   a gear ratio selector for deciding a gear ratio of a transmission; and
   a throttle sensor configured to detect a throttle operation amount for controlling an intake air amount of the engine as the operation input amount;
   wherein control unit is further configured to calculate a driving force on the basis of the engine speed, gear ratio and throttle operation amount and calculates the acceleration on the basis of the driving force.

9. The suspension controlling apparatus for a vehicle according to claim 1, wherein the control unit is further configured to:
   detect a brake operation amount as the operation input amount; and
   calculate the acceleration on the basis of deceleration corresponding to the brake operation amount.

10. The suspension controlling apparatus for a vehicle according to claim 9, wherein a variation amount limit value for limiting a variation amount of the target damping force is set in advance in the control unit.

11. The suspension controlling apparatus for a vehicle according to claim 1, wherein a variation amount limit value for limiting a variation amount of the target damping force is set in advance in the control unit.

12. The suspension controlling apparatus for a vehicle according to claim 11, wherein a variation amount limit value for acceleration and a variation amount limit value for deceleration which limit a variation amount of the target damping force are set in advance in the control unit.

13. A suspension controlling apparatus for a vehicle, comprising:
   a suspension with a variably settable damping force; and
   a control unit for controlling the damping force of the suspension on the basis of a target damping force;
   the control unit configured to:
   calculate an acceleration in a forward and rearward direction of the vehicle on the basis of an operation input amount to the vehicle; and
   determine the target damping force on the basis of a predetermined damping force map in response to the acceleration and a differentiation value of the acceleration.

14. The suspension controlling apparatus for a vehicle according to claim 13, wherein the control unit receives, as an input thereto, a vehicle speed detected by a vehicle speed sensor and calculates traveling resistance of the vehicle on the basis of the vehicle speed, and calculates an acceleration in the forward and rearward direction of the vehicle on the basis of the traveling resistance and the operation input amount.

15. The suspension controlling apparatus for a vehicle according to claim 14, and further comprising:
   an engine speed sensor configured to detect an engine speed;
   a gear ratio selector for deciding a gear ratio of a transmission; and
   a throttle sensor configured to detect a throttle operation amount for controlling an intake air amount of the engine as the operation input amount;
   wherein the control unit calculates a driving force on the basis of the engine speed, gear ratio and throttle operation amount and calculates the acceleration on the basis of the driving force.

16. The suspension controlling apparatus for a vehicle according to claim 14, wherein the control unit is further configured to:
   detect a brake operation amount as the operation input amount; and
   calculate the acceleration on the basis of deceleration corresponding to the brake operation amount.

17. The suspension controlling apparatus for a vehicle according to claim 13, and further comprising:
   an engine speed sensor configured to detect an engine speed;
   a gear ratio selector for deciding a gear ratio of a transmission; and
   a throttle sensor configured to detect a throttle operation amount for controlling an intake air amount of the engine as the operation input amount;
   wherein the control unit calculates a driving force on the basis of the engine speed, gear ratio and throttle operation amount and calculates the acceleration on the basis of the driving force.

18. The suspension controlling apparatus for a vehicle according to claim 13, wherein the control unit is further configured to:
  detect a brake operation amount as the operation input amount; and
  calculate the acceleration on the basis of deceleration corresponding to the brake operation amount.

19. The suspension controlling apparatus for a vehicle according to claim 13, wherein a variation amount limit value for limiting a variation amount of the target damping force is set in advance in the control unit.

20. The suspension controlling apparatus for a vehicle according to claim 19, wherein a variation amount limit value for acceleration and a variation amount limit value for deceleration which limit a variation amount of the target damping force are set in advance in the control unit.

* * * * *